Sept. 15, 1970  H. W. WESSELLS III  3,528,699
VEHICLE BODY SIDE SILL TO REAR SILL TRANSITION STRUCTURE
Filed Dec. 11, 1968  3 Sheets-Sheet 1

INVENTOR.
Henry W. Wessells, III
BY
John B. Sowell
ATTORNEY

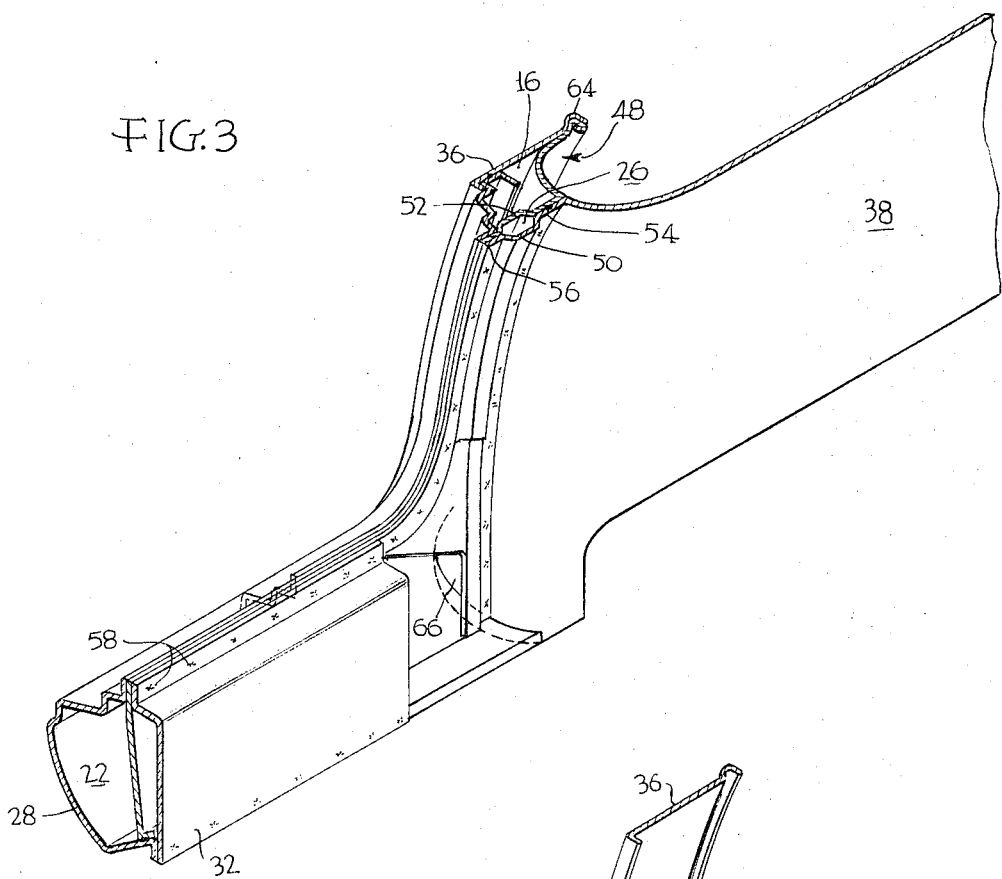
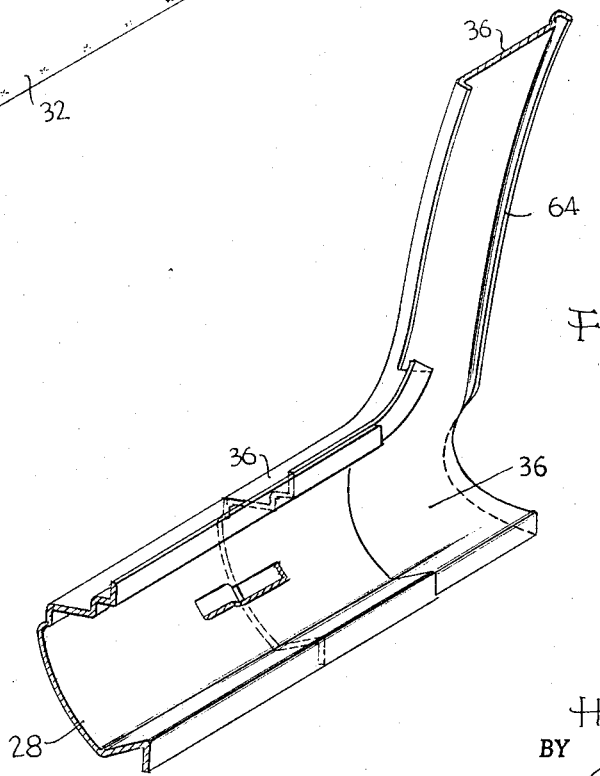

Sept. 15, 1970   H. W. WESSELLS III   3,528,699
VEHICLE BODY SIDE SILL TO REAR SILL TRANSITION STRUCTURE
Filed Dec. 11, 1968   3 Sheets-Sheet 3
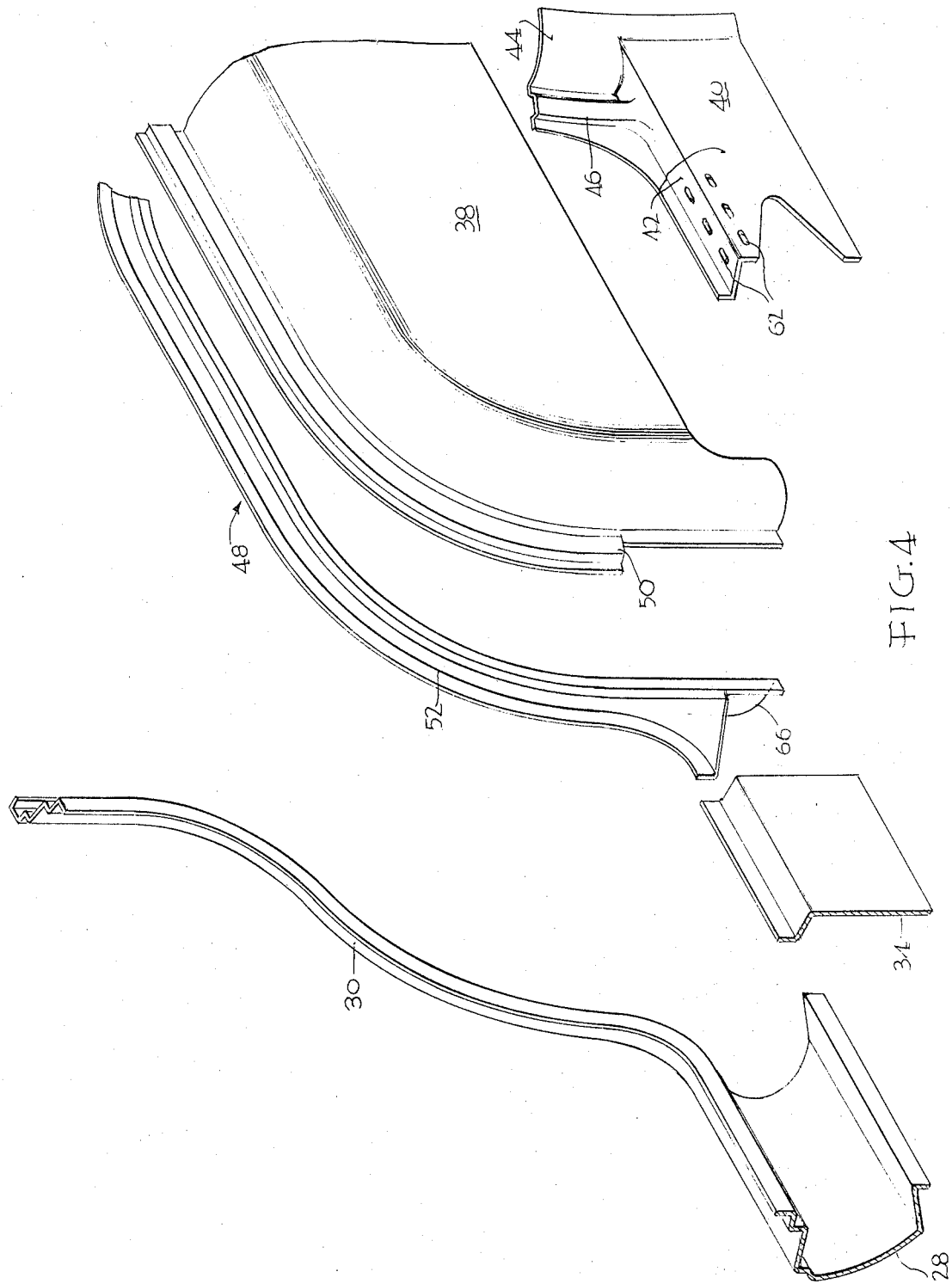
INVENTOR.
Henry W. Wessells, III
BY
John B. Sowell
ATTORNEY 3,528,699
VEHICLE BODY SIDE SILL TO REAR SILL
TRANSITION STRUCTURE
Henry W. Wessells III, Paoli, Pa., assignor to The Budd
Company, Philadelphia, Pa., a corporation of Pennsylvania
Filed Dec. 11, 1968, Ser. No. 783,084
Int. Cl. B62d 27/02
U.S. Cl. 296—28                                       9 Claims

ABSTRACT OF THE DISCLOSURE

A unitized automobile body having a plurality of formed and connected panels providing a continuous and strong transition between the side sill and the rear sill structure.

BACKGROUND OF INVENTION

It has been the general practice in the unitized automobile body art to provide a frame or truss-like structure around the door openings. The lower beam or side sill of this truss is a major load carrying member. Rear sills or beams are extended rearwardly from the termination of the side sills at the D-posts to transfer the load from the support springs and shock absorbers to the side sills and the upper balloon or passenger compartment of the body. Stress concentrations which occur at the transition between the side sills and the rear sills have heretofore been reduced by making the joints flexible or by reinforcing the panels comprising the sills.

SUMMARY OF THE INVENTION

According to the present invention the transition between the side sills and the rear sills is made through large formed panels which transmit loads in shear and minimize bending stresses.

The rear wheel housing comprises two similarly-shaped formed panels joined along a central seam to provide an elongated hemispherical housing. The seam is extended radially as a channel-shaped member on each wheel house and is joined to provide a segment of an annular hollow beam or rear sill integral with the rear wheel housing. The extension of the rear wheel housing has a large flange area permititng the side sill panels to be overlappingly secured to the flanges on the wheel housing. Thus, the transition between the side sills and the rear sills is made substantially rigid without the aid of supplementary reinforcing structure, and the loads which are normally concentrated in bending are distributed over large area shear panels substantially reducing unit stresses in the transition structure.

BRIEF DESCRIPTION OF THE DRAWINGS

FIG. 3 is a perspective view of the structure of FIG. 2 with the transition piece removed and the remaining panels shown in partial section;

FIG. 4 is an exploded perspective view of the structure shown assembled in FIG. 2;

FIG. 5 is a perspective view of the outer rear quarter panel and uniside frame of FIGS. 2 to 4.

DESCRIPTION OF THE PREFERRED EMBODIMENT

Figure 1:
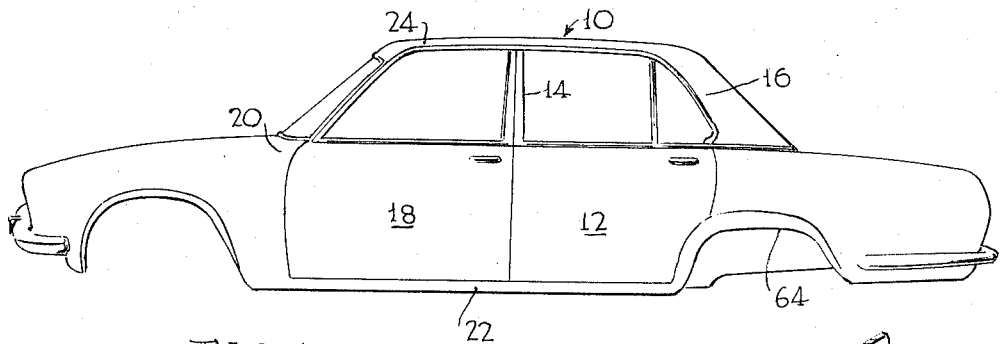
FIG. 1 is a side view of a vehicle body embodying the present invention.

Vehicle body 10 represents a standard size automobile body of unitized construction having a rear door 12 hinged upon the BC-post 14 to close or lock upon the D-post 16. The front door 18 is hinged upon the A-post 20 to close or lock upon the BC-post 14. A structural frame or truss comprising the vertical A-post 20, BC-post 14, D-post 16 members, the horizontal side sill 22 and roof rail 24 surround the doors 12, 18. The weight of passengers and the passenger compartment itself is transmitted into the structural frame and must be conducted to the wheels of the vehicle. The present invention is concerned with the transmission of loads and stresses from the side sills 22 to the rear sills 26 which are connected to the rear wheels by springs and shock absorbers (not shown).

Side sill 22 comprises an outer side sill portion 28 of a uniside frame 30, an inner side sill portion 32, and a side sill plate 34. The rear of the outer side sill portion 28 is stepped down a single thickness of sheet metal and the outer rear quarter panel 36 is overlappingly secured thereto, thus, the outer portion of the side sill 22 is formed as a double thickness of sheet metal at the transition from the side sill to the D-post. The rear of the inner side sill portion 32 may be extended until it touches and connects to the inner wheel house 38 to facilitate assembly. A transition piece 40 is provided with: a sill portion 42 which is overlappingly secured to the inner side sill 32, a wheel house portion 44 which is overlappingly secured to the inner wheel house 38 and a rear sill portion 46 which is overlappingly secured to the rear sill 26. Thus, the inner sill portion 32 of side sill 22 is formed as a double thickness of sheet metal at the transition from the side sill to the D-post.

As best shown in FIG. 3, where the transition piece 40 has been removed, the rear sill 26 is formed as a radial extension of the inner wheel house 38 and the outer wheel house 48. The radial extensions 50, 52 are hat-shaped in section having radially inner flanges 54 and radially outer flanges 56. It will be understood that the rear sill begins at the top of the side sill and continues as a hollow beam around the top of the wheel housing. The rear sill 26 is connected at its radially outer flanges 56 to the uniside frame 30 to form part of the D-post 16 which further comprises a portion of the outer rear quarter panel 36 and a portion of the outer wheel house 48.

A load imposed on the rear wheels is transmitted into the springs and shock absorbers (not shown) and into the wheel houses 38, 48. The wheel houses are connected to the rear sill 26 which in turn is connected to the D-post 16 through panels connected in shear along substantially vertical planes. The D-post 16 is formed by the uniside frame 30 and the outer rear quarter panel 36 (which also forms part of the side sill 22). The inner rear sill 50 and a portion of the inner wheel house 38 is continued by the transition piece 40 which is overlappingly secured to the inner side sill 32. The connections between panels are preferably made by resistance welds 58. When the post and sill areas are closed so that resistance welding is not feasible, mating seams may be arc welded. Overlapping panels, if not securable together by resistance welds at mating panels or adjacent flanges, may be secured by plug welds 60 deposited in apertures 62 of the outer overlapping panels. A sealant (not shown) may be applied between the mating areas of any of the panels to be connected whenever a moisture-tight connection is desired.

Figure 2:
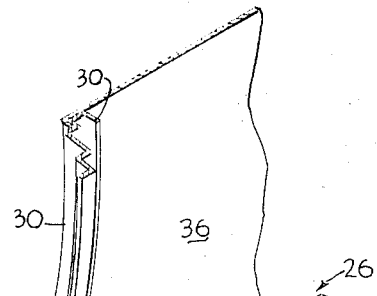
FIG. 2 is an enlarged perspective view of the side sill to rear sill transition at the right rear wheel area as seen from inside the vehicle.
Figure 2:
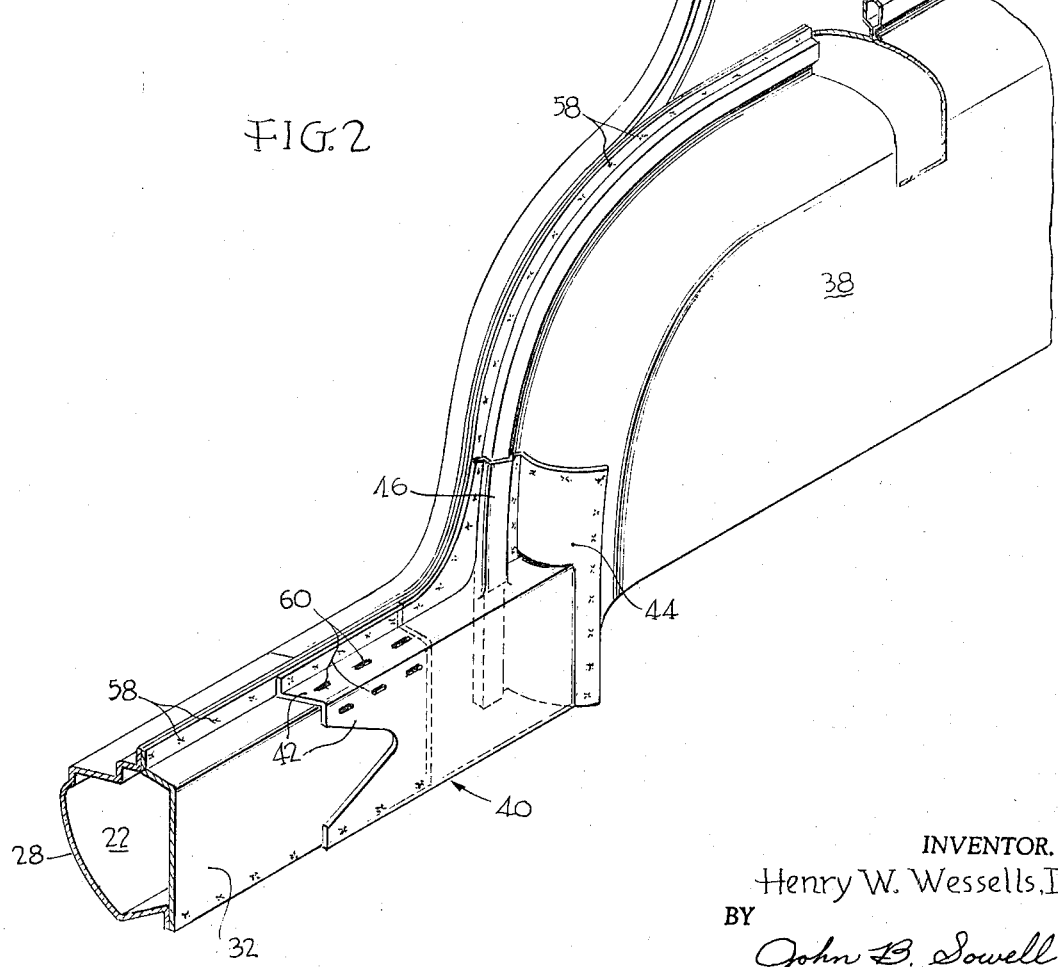

The transition piece 40, as best shown in FIGS. 2 and 4, is connected over the side sill 22 and the inner wheel house 38 to close off the end of the inner portion of the side sill 22. As best shown in FIGS. 1, 3 and 5 a flange on outer rear quarter panel 36 forms the lower edge thereof and is directed inwardly to overlap the lower edge 66 of the outer wheel house 48. Flange 64 is secured to edge 66 across the end of side sill 22 to close off the outer portion of the side sill 22. In other types of vehicle bodies it may be desirable to close off the sills and beams with separate panels to simplify the assembly of panels having more complex configurations.

Having explained the structure of the preferred embodiment, it is apparent that the panel structure at the transition between the side sill 22 and the rear sill 26 has been accomplished in a novel manner wherein the sills are interconnected by panels which transfer stresses in shear. The areas adjacent the junction of the sills are overlapped by the transition panels to reinforce the sills and minimize stresses in bending. The transition between the sills is accomplished by outer panels which have the normal shape and appearance of a side sill and rear quarter panel and by inner panels which occupy the same space as the side sill and the D-post.

While a single embodiment of the present invention has been described for purposes of illustration, it is to be understood that there may be other embodiments and modifications within the general scope of the invention.

What is claimed is:

1. In an automobile body, a side sill to rear sill transition structure comprising, a uniside frame having an outer side sill portion and a D-post portion formed therewith, a rear quarter panel secured to the side sill portion and to the D-post portion of said uniside frame, an outer wheel house secured to said rear quarter panel and to said D-post portion of said uniside frame, an inner side sill connected to said outer side sill, an inner wheel house secured to said other wheel house, said wheel houses providing a rear sill portion at their mating seam, and a transition piece overlappingly secured to said inner wheel house and said inner side sill, whereby forces transmitted from the rear sill to the side sill are conducted in shear through said wheel houses to the rear quarter panel, said uniside frame and said transition piece.

2. In an automobile body structure as set forth in claim 1, wherein there is further provided a side sill plate connected between the inner and outer side sills.

3. In an automobile body as set forth in claim 1, wherein said outer wheel house and said rear quarter panel are connected along the marginal edges of the outer wheel house and form an end closure of the side sill.

4. In an automobile body as set forth in claim 3, wherein said inner wheel house and said outer wheel house are provided with hat-shaped arcuate rear sill members connected at their inner and outer flanges as reflected images of each other.

5. In an automobile body as set forth in claim 4, wherein said transition piece is formed as an extension of said inner side sill and is overlappingly secured thereto, and said transition piece being further formed as a mating replica of a portion of said inner wheel house and is overlappingly secured thereto.

6. In an automobile body as set forth in claim 5, wherein said transition piece is further formed as replica of a portion of said hat-shaped arcuate rear sill and is overlappingly secured thereto.

7. In an automobile body as set forth in claim 4, wherein said rear sill formed by said wheel houses terminates at the top of the side sill.

8. In an automobile body as set forth in claim 6, wherein said transition piece is provided with a plurality of apertures and plug-welded to the surface of the inner side sill through said apertures.

9. In an automobile body as set forth in claim 1, wherein said rear sill is connected to said side sill through substantially vertical panels connected in shear planes.

References Cited
UNITED STATES PATENTS

| | | | |
|---|---|---|---|
| 2,662,793 | 12/1953 | Lindsay | 296—28 |
| 2,669,462 | 2/1954 | Toncray et al. | 296—28 |

BENJAMIN HERSH, Primary Examiner

R. R. SONG, Assistant Examiner